United States Patent
Allen

(10) Patent No.: US 11,068,898 B2
(45) Date of Patent: *Jul. 20, 2021

(54) VIRTUAL PAYMENT CARD FRAUD DETECTION

(71) Applicant: VPAY, INC., Plano, TX (US)

(72) Inventor: Robert M. Allen, Plano, TX (US)

(73) Assignee: VPay, Inc., Plano, TX (US)

(*) Notice: Subject to any disclaimer, the term of this patent is extended or adjusted under 35 U.S.C. 154(b) by 105 days.

This patent is subject to a terminal disclaimer.

(21) Appl. No.: 16/559,739

(22) Filed: Sep. 4, 2019

(65) Prior Publication Data

US 2019/0392451 A1    Dec. 26, 2019

Related U.S. Application Data

(63) Continuation of application No. 15/087,374, filed on Mar. 31, 2016, now Pat. No. 10,445,735, which is a continuation-in-part of application No. 14/840,783, filed on Aug. 31, 2015, now abandoned.

(60) Provisional application No. 62/044,234, filed on Aug. 30, 2014.

(51) Int. Cl.
*G06Q 20/40* (2012.01)
*G06Q 20/34* (2012.01)
*G06Q 20/10* (2012.01)

(52) U.S. Cl.
CPC ......... *G06Q 20/4016* (2013.01); *G06Q 20/10* (2013.01); *G06Q 20/351* (2013.01); *G06Q 20/4018* (2013.01)

(58) Field of Classification Search
USPC .................................................. 705/35, 44
See application file for complete search history.

(56) References Cited

U.S. PATENT DOCUMENTS

| | | |
|---|---|---|
| 5,590,196 A | 12/1996 | Moreau |
| 5,677,955 A | 10/1997 | Doggett et al. |
| 5,832,460 A | 11/1998 | Bednar et al. |
| 5,890,129 A | 3/1999 | Spurgeon |
| 6,003,007 A | 12/1999 | DiRienzo |
| 6,901,387 B2 | 5/2005 | Wells et al. |
| 7,380,707 B1 | 6/2008 | Fredman |
| 7,752,134 B2 | 7/2010 | Spear |
| 8,204,766 B2 | 6/2012 | Bush |

(Continued)

FOREIGN PATENT DOCUMENTS

EP    1049056    11/2000

OTHER PUBLICATIONS

Virtual Card Payment Protocol and Risk Analysis Using Performance Scoring Xu Xianhua (Year: 2001).*

(Continued)

*Primary Examiner* — William E Rankins

(74) *Attorney, Agent, or Firm* — Nicholas Pfeifer; Smith & Hopen, P. A.

(57) ABSTRACT

Like many credit card payments, virtual card payments are subject to fraudulent transactions. To lower this possibility, data collected from a settlement transaction is stored including a merchant category code, a tax identification number, a merchant identification and an IP address of the processing terminal. Subsequent payments from the same payor to the same payee are verified against the previous settlement transaction data to minimize the possibility of fraud.

18 Claims, 3 Drawing Sheets

(56) References Cited

U.S. PATENT DOCUMENTS

| | | | |
|---|---|---|---|
| 2001/0034618 A1 | 10/2001 | Kessler et al. | |
| 2002/0138426 A1* | 9/2002 | Craddick | G06Q 20/00 705/40 |
| 2002/0194027 A1 | 12/2002 | Smith | |
| 2003/0080183 A1* | 5/2003 | Rajasekaran | G06Q 20/04 235/379 |
| 2004/0064420 A1* | 4/2004 | Buist | H04L 67/12 705/64 |
| 2004/0249745 A1 | 12/2004 | Baaren | |
| 2005/0033604 A1 | 2/2005 | Hogan | |
| 2005/0209964 A1 | 9/2005 | Allen et al. | |
| 2005/0261944 A1 | 11/2005 | Rosenberger | |
| 2006/0010016 A1 | 1/2006 | Kossol et al. | |
| 2007/0005402 A1 | 1/2007 | Kennedy et al. | |
| 2009/0222353 A1 | 9/2009 | Guest et al. | |
| 2012/0303425 A1* | 11/2012 | Katzin | G06Q 20/32 705/14.4 |
| 2014/0129435 A1* | 5/2014 | Pardo | G06Q 20/36 705/41 |
| 2015/0142657 A1* | 5/2015 | Sagastiverza | G06Q 20/32 705/44 |

OTHER PUBLICATIONS

Petition for Covered Business Method Review as filed with the United States Patent Trial and Appeal Board in re Post-Grant Review of corresponding U.S. Pat. No. Re. 43,904 on Aug. 19, 2013.

Joint Claim Construction and Prehearing Statement, *Stoneeagle Services, Inc.* v. *Gillman, et al.*, Civil Docket No. 3:11-CV-2408-P-BD (N.D. Texas).

"AP vPayment XML Supplier Training", GE Corporate Payment Services, dated Jan. 26, 2005.

Visa Commercial Solutions: Merchant Category Codes for IRS Form 1099-MISC Reporting, Visa U.S.A. Inc., 2004.

District Court's Order responsive to Motion for Summary Judgment in C.A. No. 8:13-cv-2240-T-33MAP pp. 1-30.

Decision Institution of Inter Partes Review Case, IPR2015-00569 U.S. Pat. No. Re. 44,748 E, Entered: Jul. 31, 2015, pp. 1-36.

Decision Denying Institution of Covered Business Method Patent Review, Case CBM2013-00047 U.S. Pat. No. Re. 43,904, Entered: Feb. 18, 2014, pp. 1-24.

Decision Denying Institution of Inter Partes Review, Case IPR2014-01414 U.S. Pat. No. Re. 43,904 E, Entered: Mar. 4, 2015, pp. 1-24.

* cited by examiner

VIRTUAL PAYMENT CARD FRAUD DETECTION

PRIORITY CLAIM

This application is a continuation of and claims priority to U.S. non-provisional application Ser. No. 15/087,374 filed Mar. 31, 2016 entitled "Virtual Card Fraud Detection," which is a continuation-in-part of and claims priority to U.S. non-provisional application Ser. No. 14/840,783 filed Aug. 31, 2015 entitled "Virtual Card Fraud Detection," which claims priority to U.S. Provisional Patent Application Ser. No. 62/044,234 filed Aug. 30, 2014.

BACKGROUND OF THE INVENTION

1. Field of the Invention

This invention relates to payment processing. More specifically, it relates to fraud detection for repeated virtual payment card transactions between the same payor and payee.

2. Brief Description of the Related Art

Adjudication, payment and reconciliation of service provider claims against insurance carriers (particularly in the healthcare, travel and warranty industries) consumes substantial time and resources. Third party administrators (herein "TPAs"), insurance companies, and large self-funded corporations (herein "Payers") adjudicate claims, compare them to a benefit plan and make the decision to write checks in payment for the claims. Currently, many payers are required to print checks and explanation of benefit (EOB) forms for delivery to the healthcare providers. The EOB lists the amount the healthcare provider billed the Payer's company and the amount the Payer's company paid on the claim. It may also list the contractual discount amount and the patient responsibility. If the claim is denied, the EOB will explain the reason for denial. EOB, explanation of payment (EOP) and remittance advice are synonymous for the purposes of this specification.

In an effort to streamline this process, Applicant developed a method described in U.S. Pat. No. 7,792,686, (succeeded by RE43904 and RE44748) the specification of which is incorporated herein by reference. The '686 patent discloses a method to deploy a virtual payment card to settle medical service claims. Since there is a one-to-one relationship between the virtual payment card and the specific claim, reconciling the payment is made substantially more efficient.

Virtual payment cards have a number of security advantages. Virtual payment cards generate a unique credit card number to settle a specific transaction. Also referred to as "single-use credit cards" or "one-time-use credit cards", virtual payment cards offer businesses a highly controlled and secure way of making payments.

A single-use virtual payment card number is issued for a specific transaction or claim, similar to what traditionally was only paid by a check. Once the transaction is processed, the virtual payment card number becomes invalid until it is "recycled" sometime later for another payment. However, a recycled virtual payment card number will likely be mated with a new expiration date and security code as well. Virtual card payments are processed just like traditional credit card payments and are highly convenient for the payee.

For payment of claims (medical, warranty, travel and the like) the workflow often involves a payment processor that directs the delivery of virtual payment cards to payees on a regular basis. One such payment processor operates under the brand STONEEAGLE. A payment processor like STONEEAGLE may process hundreds of millions of dollars in payments using virtual payment cards with a substantial amount of repeat payments to the same payees (e.g., health care providers).

Virtual card payments to payees are tightly control, highly secure and promptly reconciled. Accordingly, opportunities for fraud are limited in frequency as well as scope (e.g., virtual cards are unique for a transaction and further limited in authorized amounts). However, it is possible that some fraud could occur, most likely internal to the payee's business operation.

For example, a payment processor may send a virtual payment card for a $1,000 authorized claim payment to a health care provider office. An employee within that office intercepts the virtual payment card information and using a portable card terminal, processes the virtual payment card transaction for his own benefit thereby stealing the payment intended for his employer. The employee would have a difficult time keeping the theft secret for long as the details of the transaction including his merchant account, depositing bank, IP address of his portable device and other meta data of the transaction would be captured and stored.

Nevertheless, as virtual card payments have become more ubiquitous in business-to-business commerce, there is a need for additional security controls to reduce opportunities for theft.

SUMMARY OF THE INVENTION

The present invention includes a method of fraud detection for repetitive virtual payment card transactions to a payee from a payor such as is common in the health care industry. A unique payee identification is established by the payor based on the tax identification number (TIN) of the payee. This could be a direct correlation, a hash or other unique derivation of the TIN. While other unique identity values are possible under this invention the payment processor (the entity making repetitive payments) is almost always privy to the TIN which therefore becomes a useful identifier.

A first virtual card payment is sent to a payee having a payment terminal through which card payments are processed. Virtual payment cards are generated electronically and are not reduced to a physical plastic card. The payment terminal is connected to the Internet which then connects it to a payment acquirer, card processing network and the like. The virtual card payment is processed by the payee through the payment terminal thereby completing a settlement transaction. Because the virtual card does not have a magnetic strip, the card account number and other data can be manually keyed in into the terminal.

The settlement transaction data is sent to an acquirer which collects an array of data from the settlement transaction including a merchant category code, an IP address from the payee's terminal connection to the Internet and the tax identification number of the payee. This array of data is stored in a database in association with the unique payee identification. Subsequent payment processing attempts by payee are either approved or denied by matching the merchant category code, tax identification number and IP address of the subsequent attempt against the stored array of data.

An embodiment of the invention includes a computer-implemented method of paying an administrator-approved claim through a payment processor by a virtual payment card account over a network. The payment processor receives one or more data files into a payment processor computing system operating on a computing device. The data files are sent from a remote administrator computer to pay an adjudicated claim in an authorized amount to a designated payee. The one or more data files may include remittance advice for the claim. The transfer of the data files may be by FTP, web service, database query or the like. The computing device would typically be a CPU server running a server operating system such as those under the brands LINUX, SOLARIS, WINDOWS SERVER, MAC OS X SERVER or the like. A payment processor computing system may be one or more individual computing devices, a plurality of them communicatively coupled through a network connection. A computing device is interpreted broadly as one or more individual instances of an operating system working collectively together through network connections, either locally or remotely.

The payment processor computing system requests the virtual payment card account over a network connection to a card issuing application in a first amount to the payee. The virtual payment card account having an account number, an expiration date and a CVV code. Virtual payment cards have a unique primary account number to settle a specific transaction.

The virtual card account number, expiration date, CVV code and associated remittance advice for the claim is sent from the payment processor computing system to the payee of the claim. This may be done by hardcopy mailing, fax, or electronic transmission over the Internet. The payee electronically processes the virtual payment card data on a payment card terminal for the claim in an amount equal to the authorized amount for the claim.

The payment processor computing system receives notification of the processed payment through a network connection and matches it to the claim thereby confirming payment was processed by the payee in the amount authorized by the administrator.

The payment processor stores data values from the transaction which may include a merchant category code, an IP address from the payee's terminal connection to the Internet and the tax identification number of the payee. The payment processor is now in a unique position, having that data from a verified transaction, to check subsequent virtual payment card transactions to the same payee because virtually all the core data parameters (except and amount and date) should be the same.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The present invention relates to fraud detection in the virtual card payment industry. For example, virtual card payments are frequently made to health care providers on behalf of third party administrators that adjudicate claims. These are regular, reoccurring payments made by virtual payment cards that are chargeable through a merchant terminal.

In an embodiment of the invention, a payor sends a payment processor a payee identification code which may be the tax identification number (TIN) of the payee. The TIN is stored with the payee's other information for future reference in a database. The credit card terminal through which the payee processes the virtual card payment is connected to the Internet and inherently has an IP address which is an array of four integers under Version 4 of the Internet addressing protocol. The terminal will also have a Merchant Category Code (MMC) which defines the type of business and a Merchant Identification (MID) that is associated with the payee's credit card terminal account. This data (IP address, MMC, MID, TIN) is collected from the settlement transaction by the acquirer and returned to the payment processor. This acquirer-collected data is added to the database in association with the payee ID. The next time the payor makes payment to payee the processor can validate that the same merchant used the card from the same location by analyzing the subsequent set of settlement data returned.

Figure 1:
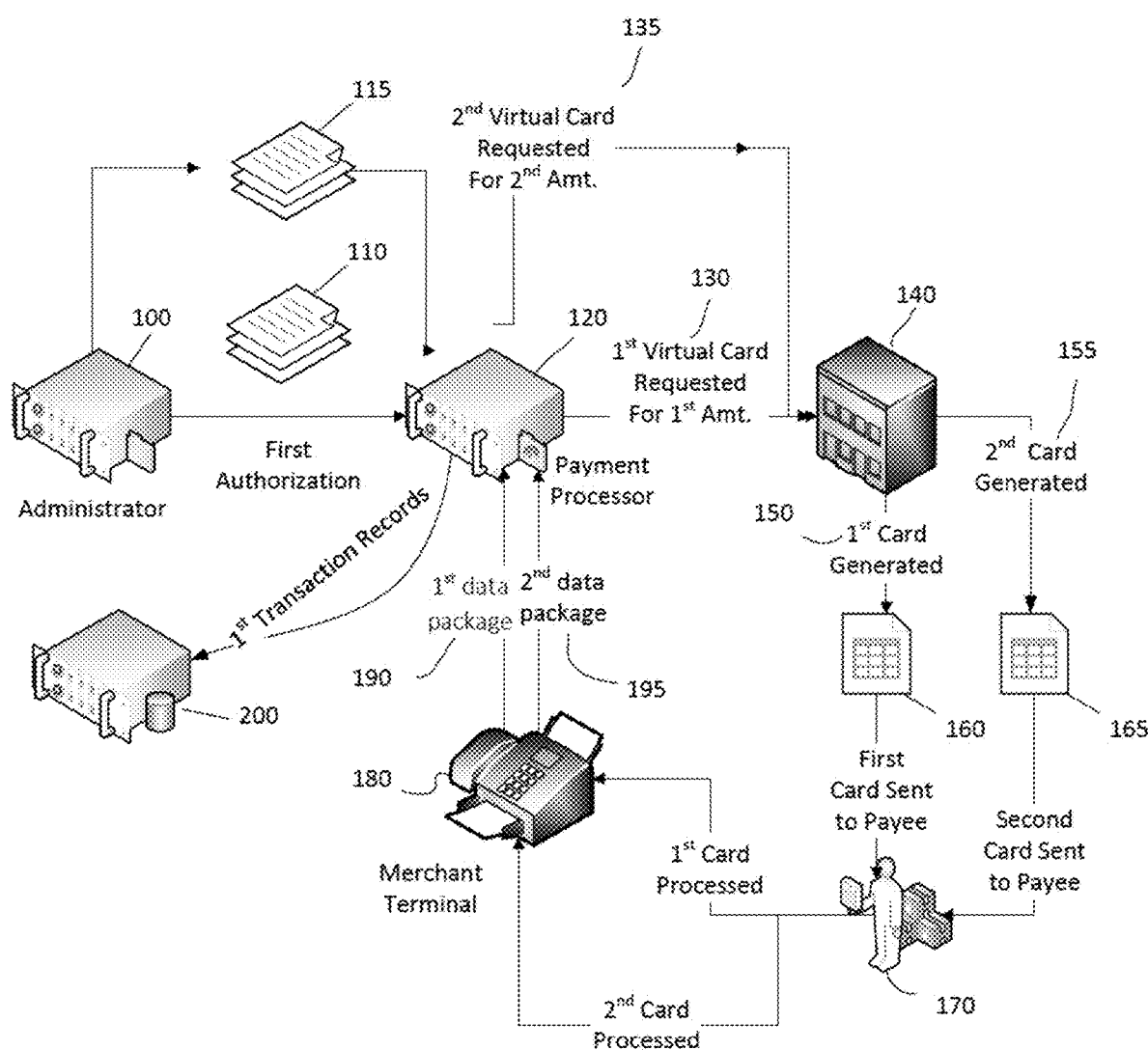
FIG. 1 is a diagrammatic view of an embodiment of the invention.

In FIG. 1, remote administrator computer 100 sends data file 110 to payment processor computing device 120. Data file 110 includes payee identification (typically including a TIN), and an amount to pay which is usually integral to the remittance advice. Payment processor 120 requests a virtual payment card 130 from a card issuing authority 140 in a first authorized amount. A virtual payment card is generated 150 and sent with remittance advice, the virtual payment card account number, an expiration date and a CVV code 160 to payee 170. Virtual payment card is generated electronically and not reduced to a physical plastic card. Payee 170 runs first virtual payment card on merchant terminal 180 and a notification data package 190 is received responsive from the transaction by payment processor 120. Notification data package 190 includes alphanumeric data strings retrieved from the payee's merchant card terminal. The strings (including both alphanumeric and integer values) may include merchant category code, tax identification number of payee, merchant ID of payee and an IP address of the connection made by the payee's merchant card terminal to the network (e.g., Internet). The values are saved in data store 200.

A second request 115 to make payment to payee 170 for a second claim is received by payment processor 120 and a second virtual payment card is requested for a second amount 135. The second amount should be considered temporal relative to the first amount. It is possible that the first amount could be equal to the second amount by coincidence. Card issuing authority 140 generates a second virtual payment card 155 which is sent with the remittance advice 165 to payee 170. Payee 170 processes the second virtual payment card through payee's merchant terminal 180 producing a second data package which is evaluated by payment processor 120 comparing the values of the second data package to the transaction records of the first data package 190 in the data store 200. Payment processor 120 will direct a decline response in the authorization process should the values in the second data package deviate from the values in the first data package.

By way of example, a merchant category code (MCC) is a four-digit number assigned to a business by credit card companies (for instance, MASTERCARD, VISA) when the business first starts accepting one of these cards as a form of payment. For example, an MMC code of 8011 is received in the first data package. For VISA merchants, 8011 is assigned to "doctors and physicians." However, an unscrupulous computer repairman at the doctor's office intercepts a second virtual payment card and attempts to run it through his personal card terminal (e.g., a smartphone application) so that funds are deposited in his account. However, the MMC code for his card terminal is 7379 which is for "computer maintenance and repair services." The 8011 MMC value for the payee is stored in a database table with a primary key index assigned to the TIN of the payee. The payment processor 120 is directing the second virtual payment card to the same payee with the same TIN and therefore the same 8011 MMC value. However, the second data package 195 contains the 7379 MMC value which does not match what is expected and the payment processor 120 directs that the second virtual payment card transaction be declined.

Figure 2:
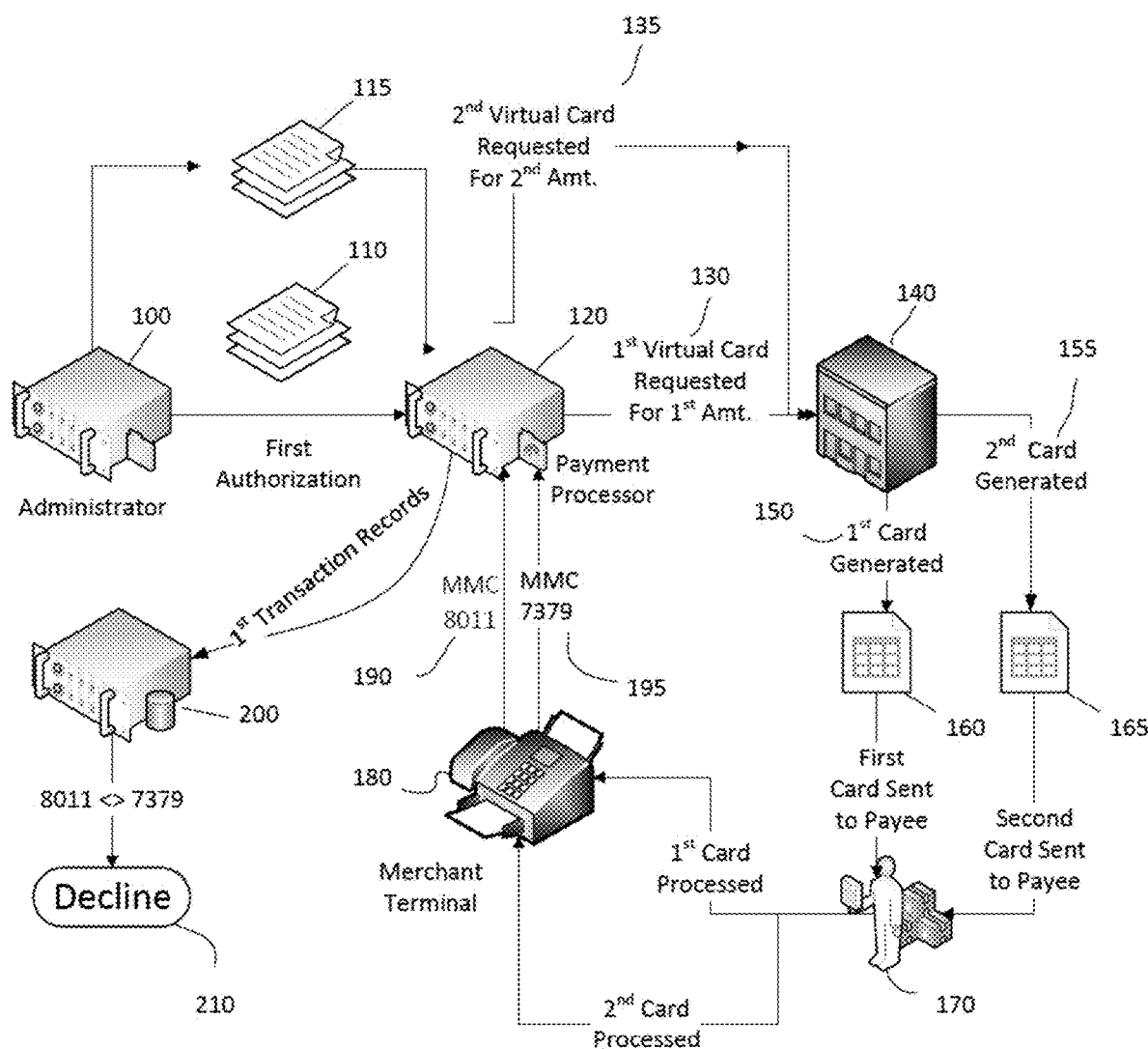
FIG. 2 is a diagrammatic view of an embodiment of the invention showing mismatching MMC values leading to a denial of an authorization attempt.

This example is shown in FIG. 2 wherein the first data package 190 includes an MMC value of 8011 for payee 170. However, when a second virtual card is attempted to be authorized the second data package 195 returns an MMC value of 7379 for the merchant terminal 180 attempting to process the second virtual card. The 7379 value does not match up with the 8011 value in the data store 200 and payment processor 120 therefore directs that an authorization response declining the transaction be generated 210.

By the same token, additional data values captured in the authorization process such as merchant identification number (MID). A MID is an alphanumeric identifier provided by the acquirer uniquely identifying the merchant on their system. The MID for a payee should be relatively static so if a second virtual card authorization attempt is made by a MID different from the first virtual card authorization for the same payee then the authorization may be declined as possibly fraudulent.

Figure 3:
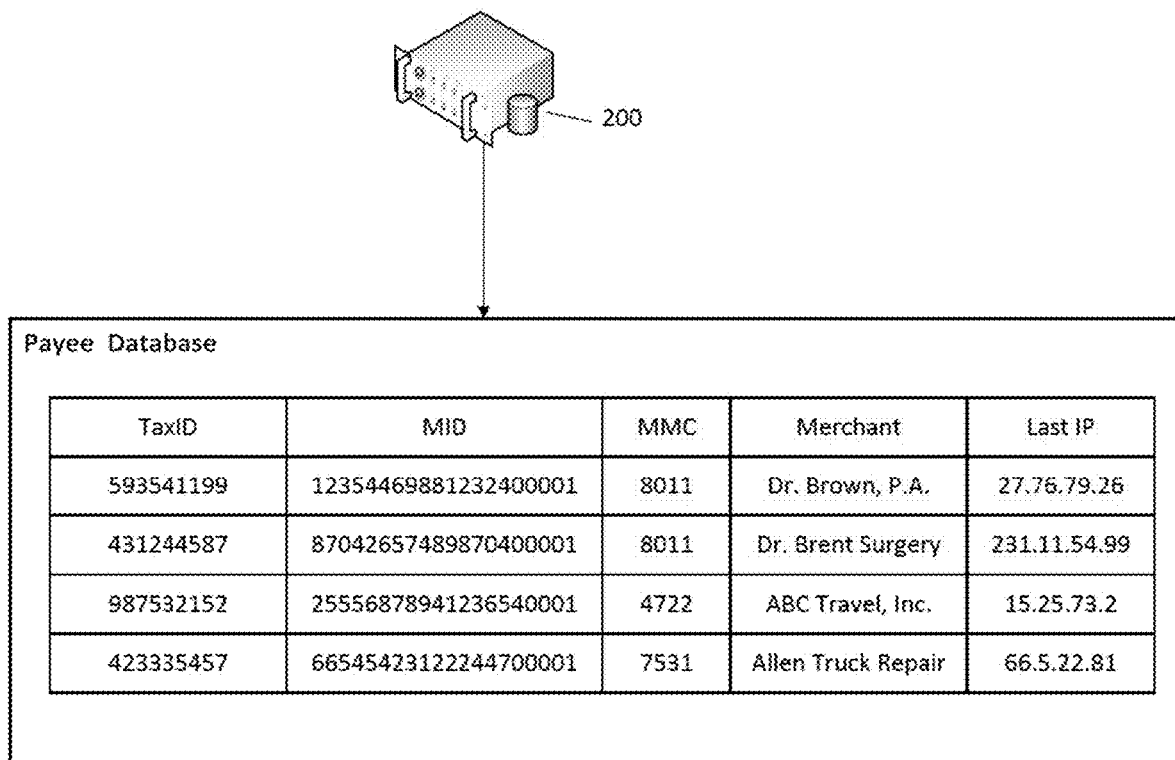
FIG. 3 is a diagrammatic view of a payee database populated by a payment processor with exemplary values for information captured in card authorization communications.

FIG. 3 is an exemplary table in data store 200 showing columns for a tax identification integer value, a MID integer value, an MMC integer value, a merchant description string value and an IP address from the last validated connection made by that merchant.

A unique feature of this invention is that the payments between the payment processor and the payee are repeating and therefore the payment processor has a unique opportunity to capture data on validated transactions that can be used to improve security on subsequent transactions.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Administrator: means an entity reviewing and/or authorizing payments to a payee. By way of example, a third party administrator (TPA) adjudicates health care claims and authorizes (and/or denies) payments to the health care provider that submitted the claims.

Authorization Approval Code: is a numerical code assigned to a sales transaction indicating that the sale is authorized.

AVS: is address verification services. AVS uses the billing information associated with a card to verify the cardholder's address.

Bank Account Information: information used to identify a specific bank account. This information can include routing numbers, account data, account numbers and other information used to identify a bank account.

BIN: is a six-digit Bank Identification Number assigned to each federally insured financial institution for the routing of transactions and other purposes. It is also known as an Issuer Identification Number (IIN) the first digit of which is the Major Industry Identifier (MII).

Card Association: a collective network of both the card network and the banks that issue cards operable on the network's infrastructure.

Card Network: financial networks that administer the credit and debit card processing. These networks include those known by the brands VISA, MASTERCARD, AMERICAN EXPRESS, DISCOVER, DINER'S CLUB, and JCB.

Card Verification Code (CVV): is numeric security code that provides extra security against unauthorized use during non-face to face transactions. CVV codes are three-digit numbers on the back of VISA and MASTERCARD credit and debit cards. The CVV number helps guard against the use of data stolen from payment networks by hackers. Intercepted data will usually comprise the cardholder name, card number and card expiration date, but not the CVV, which is generally obtained only by viewing the physical card.

Computer Based Server: a computer hardware system dedicated to running one or more services. Services can vary from database server, file server, mail server, print server, web server, or various other types services achieved through a computer program.

Computing Device: a computer hardware system typically connected by a wide area or local area network to transmit data, receive data, and store (either ephemerally or permanently) said data in conjunction with its programming Computing device may also perform business logic, calculations, and present data by various media.

Computing System: means one or more computers communicatively coupled through local and/or wide area network connections to perform coordinated tasks directed by software instructions fixed to a tangible, computer-readable medium.

Data Store: is a generic term for an electronic storage device for holding non-volatile memory such as values, tables and the like. Data stores are frequently also known as database that accept commands to insert, edit, query and delete records.

Digital storage medium: is any data repository able to save non-transitory information. This is typically or more hard drives operable by a relational database.

EDI: Electronic Data Interchange.

EFT: Electronic Funds Transfer.

Electronic Remittance Advice (ERA): Any of several electronic formats for explaining the payments of health care claims.

Enhanced Data: Additional data submitted by a merchant through a credit card network that typically lowers the interchange rate incurred for the transaction. Enhance data includes sales tax breakdown, customer references, merchant order numbers, transportation information, hotel accommodation information, car rental data, product codes, item descriptions, item quantities, item units, discount amounts, shipping information and the like. This additional data is known as Level II and Level II data.

Explanation of benefits (EOB): is a statement typically sent by a health insurance entity explaining what medical services were covered under an insurance policy. An EOB will typically include a summary of the services performed, the medical provider's fee and the amount a patient is responsible for.

Fax: is short for facsimile. It is a method of sending image data across the standard phone line to another fax machine. It is considered by many service providers a relatively secure means of transmitting and receiving sensitive financial and medical information.

FTP: (file transfer protocol) is an Internet protocol is used to copy files between computers—usually a client and an archive site. For the purposes of this application this includes encrypted variants such as Explicit FTPS, SSH File Transfer Protocol and tunneling a normal FTP session over an SSH connection.

HTTP: (hypertext transfer protocol) is the protocol used to transmit and receive all data over the World Wide Web. HTTPS is a secure variant of HTTP.

IIN: a six-digit Issuer Identification Number (IIN) (also known as the "Bank Identification Number" (BIN)) the first digit of which is the Major Industry Identifier (MII).

IP Address: is a numerical label assigned to each device (e.g., computer, printer) participating in a computer network that uses the Internet Protocol for communication.

Issuing Bank: the bank that issues a credit, debit or stored value card to a consumer. This may be synonymous with the card processor in the context of the current claims. This is typically the cardholder's financial institution but in the case of a payment processor, the issued cards may be that of the processor.

Merchant Card Terminal: a payment terminal, also known as a point of sale terminal, credit card terminal, EFTPOS terminal, is a device which interfaces with payment cards to make electronic funds transfers. There are various types of terminals available to merchants, although most have the same basic purpose and functions. They allow a merchant to insert, swipe, or manually enter the required credit card information, to transmit this data to the merchant service provider for authorization and, finally, to transfer funds to the merchant. Using a personal computer (PC) or smartphone with appropriate software and reader device, a merchant can replace the functionality of dedicated credit card terminal hardware using a terminal application running on a PC or smartphone. These terminal applications usually also support manual entry of the credit card number.

Notification Data Package: a collection of data values relating to the processing a virtual payment card at a merchant card terminal. The notification package may be in one or more separate remote communication transmissions from the card terminal to the merchant acquirer and then passed on to the payment processing computing system.

Payee: is the recipient of the payment card funds. In health care, this may be the service provider (e.g., physician's office). For automobile warranties, this may be the mechanic or service department. For travel, the payee may be a hotel, airline or the traveler whose itinerary is often managed on his or her behalf.

Payor: In health care, an entity that assumes the risk of paying for medical treatments. This can be an uninsured patient, a self-insured employer, or a health care plan or HMO. Payor may also be used in other industries such as automobile warranty claims and travel services (such as paying for an employee's hotel room or airline ticket).

Payment Card: refers to any credit card, debit card, stored value card or the like.

Personal Information: information that can be used to uniquely identify, contact, or locate a single person or can be used with other sources to uniquely identify a single individual.

PCI DSS: is an acronym for the payment card industry data security standard. PCI DSS is a security standard for organizations that handle cardholder information.

Remittance Advice: is synonymous with an EOB (see above). It is an explanation of payment (EOP).

Repetitive: occurring more than once.

Service Provider: refers to the entity that provides services to be paid for. Service providers applicable to the current invention may include, but are not limited to, construction contractors, vehicle repair shops, pharmacies and medical service providers.

SMS: (short message service) is a wireless technology for sending short text messages between mobile phones, fax machines, and IP addresses. It's similar to paging, except that the recipient's phone doesn't need to be active; instead, the message is stored.

SMTP: Simple Mail Transfer Protocol is used to send email. The SMTP protocol provides a common language for different servers to send and receive email messages. The default TCP/IP port for the SMTP protocol is port 25.

Standard Industrial Classification (SIC) code: is a United States government system for classifying industries by a four-digit code. This is also known as a Merchant Category Code (MCC).

Storage Device: is an electronic storage medium such as a hard drive, hard drive array, solid state memory, magnetic tape, and optical drives.

Stored Value Card: are those payment cards (in tangible or virtual form) which have a monetary value stored on them. Whereas the prepaid credit card can only be used with authorization from the cardholder, the stored value cards have an anonymous aspect. Examples of stored-value cards include the well-known telephone cards, merchant gift cards, or prepaid debit cards.

Taxpayer Identification Number (TIN): is an identification number used by the Internal Revenue Service (IRS) in the administration of tax laws. It is issued either by the Social Security Administration (SSA) or by the IRS. A Social Security number (SSN) is issued by the SSA whereas all other TINs are issued by the IRS. For the purposes of this disclosure, the TIN may be used to uniquely identify a payee.

Virtual Payment Card: are payment cards that are generated electronically and not reduced to a physical plastic card. Virtual payment cards may be processed by a service provider as a card not present (CNP) transaction or the data may be transmitted directly to the card acquirer for the service provider which in such case the CNP designation may or may not be included.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A virtual payment card processing system for fraud prevention in repetitive virtual payment card transactions to a payee from a payor, comprising:
   a payment processor computing system configured to execute the steps comprising:
      responsive to receiving a first instruction to pay a first authorized amount to a payee, establishing a first network connection to a card issuing application;
      electronically requesting over the first network connection a first virtual payment card in an amount equal to the first authorized amount, wherein the first virtual payment card is sent to the payee;
      establishing a second network connection with a payment card terminal of the payee, the payment card terminal configured to process the first virtual payment card;
      responsive to the payee initiating a validated virtual card payment transaction to process the first virtual payment card, obtaining a first set of transaction parameters from the payment card terminal, wherein the transaction parameters are selected from the group comprising of an Internet Protocol (IP) address of the payment card terminal, a Merchant Category Code (MMC), a Merchant Identification (MID) of the payment card terminal, and a Tax Identification Number (TIN) of the payee;
      responsive to receiving a second instruction to pay a second authorized amount to the payee, electronically requesting over the first network connection a second virtual payment card in an amount equal to the second authorized amount, wherein the card issuing application sends the second virtual payment card to the payee;
      responsive to the payee initiating a second virtual card payment transaction to process the second virtual payment card, obtaining a second set of transaction parameters from the payment card terminal used to initiate the second virtual card payment;
      responsive to identifying a discrepancy between the second set of transaction parameters and the first set of transaction parameters, notifying the payor of the discrepancy.

2. The system of claim 1, wherein the second virtual card payment transaction is authorized responsive to a match between the first and the second sets of transaction parameters pertaining to the TIN of the payee.

3. The system of claim 1, wherein the second virtual card payment transaction is authorized responsive to a match between the first and the second sets of transaction parameters pertaining to the MCC of the payment card terminal of the payee.

4. The system of claim 1, wherein the second virtual card payment transaction is authorized responsive to a match between the first and the second sets of transaction parameters pertaining to the merchant ID of the payment card terminal of the payee.

5. The system of claim 1, wherein the second virtual card payment transaction is authorized responsive to a match between the first and the second sets of transaction parameters pertaining to the IP address of the payment card terminal of the payee.

6. The system of claim 1, wherein the first set of transaction parameters and the second set of transaction parameters are obtained from a payment acquirer.

7. A computer-implemented method of fraud detection for repetitive virtual payment card transactions to a payee from a payor, the method comprising the steps of:
 establishing a first network connection to a card issuing application;
 electronically requesting over the first network connection a first virtual payment card in an amount equal to first authorized amount;
 electronically sending the first virtual payment card to the payee;
 establishing a second network connection with a payment card terminal of the payee, the payment card terminal configured to process the first virtual payment card;
 responsive to the payee initiating a transaction to process the first virtual payment card, obtaining a first set of transaction parameters from the payment card terminal;
 electronically requesting over the first network connection a second virtual payment card in an amount equal to a second authorized amount and sending the second virtual payment card to the payee;
 responsive to the payee initiating a second transaction to process the second virtual payment card, obtaining a second set of transaction parameters from the payment card terminal used to initiate the second virtual card payment;
 responsive to identifying a discrepancy between the second set of transaction parameters and the first set of transaction parameters, declining the second virtual card payment transaction.

8. The system of claim 7, wherein the second virtual card payment transaction is authorized responsive to a match between the first and the second sets of transaction parameters pertaining to a TIN of the payee.

9. The system of claim 7, wherein the second virtual card payment transaction is authorized responsive to a match between the first and the second sets of transaction parameters pertaining to an MCC of the payment card terminal of the payee.

10. The system of claim 7, wherein the second virtual card payment transaction is authorized responsive to a match between the first and the second sets of transaction parameters pertaining to a merchant ID of the payment card terminal of the payee.

11. The system of claim 7, wherein the second virtual card payment transaction is authorized responsive to a match between the first and the second sets of transaction parameters pertaining to an IP address of the payment card terminal of the payee.

12. The system of claim 7, wherein the first set of transaction parameters and the second set of transaction parameters are obtained from a payment acquirer.

13. A computer-implemented method of fraud detection for repetitive virtual payment card transactions to a payee from a payor, the method comprising the steps of:
 establishing a first network connection to a card issuing application;
 electronically requesting over the first network connection a first virtual payment card in an amount equal to first authorized amount;
 electronically sending the first virtual payment card to the payee;
 establishing a second network connection with a payment card terminal of the payee, the payment card terminal configured to process the first virtual payment card;
 responsive to the payee initiating a payment transaction to process the first virtual payment card, obtaining a first set of transaction parameters from the payment card terminal;
 responsive to receiving a second instruction to pay a second authorized amount to the payee, electronically requesting over the first network connection a second virtual payment card in an amount equal to second authorized amount and sending the second virtual payment card to the payee;
 responsive to the payee initiating a second payment transaction to process the second virtual payment card, obtaining a second set of transaction parameters from the payment card terminal used to initiate the second virtual card payment;
 responsive to identifying a discrepancy between the second set of transaction parameters and the first set of transaction parameters, notifying the payor of the discrepancy.

14. The system of claim 13, wherein the second virtual card payment transaction is authorized responsive to a match between the first and the second sets of transaction parameters pertaining to a TIN of the payee.

15. The system of claim 13, wherein the second virtual card payment transaction is authorized responsive to a match between the first and the second sets of transaction parameters pertaining to an MCC of the payment card terminal of the payee.

16. The system of claim 13, wherein the second virtual card payment transaction is authorized responsive to a match between the first and the second sets of transaction parameters pertaining to a merchant ID of the payment card terminal of the payee.

17. The system of claim 13, wherein the second virtual card payment transaction is authorized responsive to a match between the first and the second sets of transaction parameters pertaining to an IP address of the payment card terminal of the payee.

18. The system of claim 13, wherein the first set of transaction parameters and the second set of transaction parameters are obtained from a payment acquirer.

* * * * *